(12) United States Patent
Ogiso et al.

(10) Patent No.: US 10,254,624 B2
(45) Date of Patent: Apr. 9, 2019

(54) SEMICONDUCTOR OPTICAL MODULATION ELEMENT

(71) Applicant: NIPPON TELEGRAPH AND TELEPHONE CORPORATION, Tokyo (JP)

(72) Inventors: Yoshihiro Ogiso, Atsugi (JP); Josuke Ozaki, Atsugi (JP); Norihide Kashio, Atsugi (JP); Nobuhiro Kikuchi, Atsugi (JP); Masaki Kohtoku, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/577,918

(22) PCT Filed: Jun. 1, 2016

(86) PCT No.: PCT/JP2016/002649
§ 371 (c)(1),
(2) Date: Nov. 29, 2017

(87) PCT Pub. No.: WO2016/194369
PCT Pub. Date: Dec. 8, 2016

(65) Prior Publication Data
US 2018/0164654 A1 Jun. 14, 2018

(30) Foreign Application Priority Data
Jun. 2, 2015 (JP) .................................. 2015-112448

(51) Int. Cl.
*G02F 1/035* (2006.01)
*G02F 1/225* (2006.01)
(Continued)

(52) U.S. Cl.
CPC ............ *G02F 1/2257* (2013.01); *G02F 1/025* (2013.01); *G02F 1/225* (2013.01);
(Continued)

(58) Field of Classification Search
CPC .......... G02F 1/025; G02F 1/225; G02F 1/035; G02F 1/011; G02F 2001/212
See application file for complete search history.

(56) References Cited

U.S. PATENT DOCUMENTS 5,394,490 A * 2/1995 Kato ........................ G02B 6/13
257/432
6,647,158 B2 11/2003 Betts et al.
(Continued)

FOREIGN PATENT DOCUMENTS

JP H08-122719 A 5/1996
JP 2005-099387 A 4/2005
(Continued)

OTHER PUBLICATIONS

International Search Report dated Aug. 23, 2016, issued in PCT Application No. PCT/JP2016/002649, filed Jun. 1, 2016.
(Continued)

*Primary Examiner* — Jennifer Doan
(74) *Attorney, Agent, or Firm* — Workman Nydegger

(57) ABSTRACT

To provide a Mach-Zehnder (MZ) type semiconductor optical modulation element that can be used as a modulator, which is ultrafast and excellent in electrical stability. A semiconductor optical modulation element of a Mach-Zehnder type that performs modulation of light using a refractive index modulation region where a refractive index of the light guided to an optical waveguide is modulated and an input and output region where multiplexing/demultiplexing of the light split in the refractive index modulation region is performed, characterized in that in the refractive (Continued)

index modulation region of the optical waveguide, an n-type clad layer, an i core layer, and a p-type clad layer are stacked in the order from a top layer on a substrate surface equivalent to a (100) plane of a sphalerite-type seminsulating semiconductor crystal substrate, the n-type clad layer is formed in a ridge shape in an inverted mesa direction, and a capacitancl-oaded electrode is provided on the n-type clad layer.

6 Claims, 9 Drawing Sheets

(51) Int. Cl.
　　*G02F 1/025* 　　(2006.01)
　　*G02F 1/21* 　　(2006.01)
(52) U.S. Cl.
　　CPC .. *G02F 2001/212* (2013.01); *G02F 2202/102* (2013.01); *G02F 2202/107* (2013.01)

(56) References Cited

U.S. PATENT DOCUMENTS

| | | | |
|---|---|---|---|
| 2002/0071622 A1 | 6/2002 | Betts et al. | |
| 2010/0296766 A1 | 11/2010 | Ishibashi et al. | |
| 2011/0235961 A1 | 9/2011 | Hashimoto | |
| 2014/0199014 A1 | 7/2014 | Velthaus et al. | |
| 2014/0254998 A1 | 9/2014 | Furuya et al. | |
| 2015/0043867 A1 | 2/2015 | Kono et al. | |

FOREIGN PATENT DOCUMENTS

| | | |
|---|---|---|
| JP | 2005-144868 A | 4/2005 |
| JP | 2008-107468 A | 5/2008 |
| JP | 2008-233710 A | 10/2008 |
| JP | 2011203384 A | 10/2011 |
| JP | 2012-168356 A | 9/2012 |
| WO | WO2014103432 A1 | 7/2014 |
| WO | WO2015030891 A2 | 3/2015 |

OTHER PUBLICATIONS

International Preliminary Report on Patentability and Written Opinion dated Dec. 14, 2017, issued in PCT Application No. PCT/JP2016/002649, filed Jun. 1, 2016.
R. Kaiser et al., *High Performance Travelling Wave Mach-Zehnder Modulators for Emerging Generations of High Capacity transmitter Components*, ICTON, 2013, We.D2.2, pp. 4.
Y. Ogiso et al., *Waveguide Stripe Direction n-i-p-n Heterostructure InP Optical Modulator*, Electronics Letters, Apr. 24, 2014, vol. 50, No. 9, pp. 688-690.
Extended Search Report dated Dec. 6, 2018 in corresponding European Patent Application No. 16802809.0.
Notice of Allowance dated Dec. 18, 2018 in corresponding Japanese Patent Application No. 2017-521693.

\* cited by examiner

SEMICONDUCTOR OPTICAL MODULATION ELEMENT

TECHNICAL FIELD

The present invention relates to a semiconductor optical modulation element that functions as a high-speed optical modulator in the optical communication field.

BACKGROUND ART

In addition to an increase in optical communication capacity, the miniaturization and the low electric-power consumption of optical devices used therein have been demanded. Mach-Zehnder (MZ) optical modulators are exemplified as important element devices that involve in those characteristics, and many researches and developments thereof have been promoted. Particularly in recent years, in order to achieve the further miniaturization and lower electric-power consumption, an attention is specially focused on optical modulators using compound semiconductor materials including InP from optical modulators using lithium niobate (LN) as a material.

The characteristics of compound semiconductor optical modulators are briefly described below. In order to cause the compound semiconductor optical modulator to operate as an optical modulator, the interaction between electricity (electric field) and propagation light is utilized. The strong interaction between light and electricity is achieved by using a core layer that generally traps the light as a non-doped layer, sandwiching the core layer between p-type and n-type clad layers in the order from the top layer, and applying a reverse bias voltage thereto. Meanwhile, the p-type semiconductor used herein has a higher electrical resistivity and a higher optical absorption of material, than the n-type semiconductor, by approximately one or more order of magnitude, so that there are large problems in achieving higher-speed modulation operation and lower optical loss. In addition, a contact area between the p-type semiconductor and an electrode is sufficiently small compared with that of the n-type, so that the increase in contact resistance causes further degradation of modulation bandwidth. Approaches by the following two main ways (the improvement in the semiconductor layer and the improvement in the electrode structure) have been made in order to solve these problems.

As the approach by the improvement in the semiconductor layer, a semiconductor optical modulation element having a cross-sectional structure as illustrated in FIG. 1 was proposed in the past (for example, Patent Literatures 1 and 2). The semiconductor optical modulation element illustrated in FIG. 1 has a waveguide structure of a deep-ridge or high-mesa shape that is stacked on a substrate 10. Although the high-mesa waveguide is used in FIG. 1, this is a configuration generally employed in a semiconductor MZ modulator for strengthening the interaction between light and electricity and reducing the parasitic capacitance. A signal electrode 16 is provided on the waveguide structure via an n-type contact layer 15. A ground electrode 17 is provided on an n-type clad layer 11. FIG. 1 illustrates an npin type optical modulator in which clad layers 11 and 14 above and below a non-doped layer 12 are served as the n-type, a thin p-type layer serving as a carrier block layer 13 for suppressing the electron current between the both n layers is inserted. This npin type does not use a p-type clad that has large optical loss, thereby making it possible to use a relatively long waveguide. Moreover, the npin type is easy to simultaneously satisfy the reduction in drive voltage and the velocity match between a microwave and light wave because of the flexibility in which the thickness of a depletion layer can be appropriately designed as desired, and thus has an advantage to increase the response speed of the modulator. The RF responses calculated by calculation simulation in the npin layer structure is illustrated in FIG. 2.

However, the npin type modulator having a high-mesa shape as is in FIG. 1 involves the large variation in electric surge resistance and the instability of modulation operation, as problems. The main factor of the variation in surge resistance is considered to be in that the damage along with the waveguide side walls caused by dry etching processing lowers the function as a carrier block layer of the p-type semiconductor. The instability of modulation operation has specifically problems including generation of the incident light power dependence of the modulation efficiency, generation of the bias voltage dependence of the modulation efficiency, and the lowering of the resisting pressure. It can be considered that the main factor of this is in that hole carriers are concentrated and accumulated on the p layer in the high-mesa waveguide. In other words, hole carriers are concentrated and accumulated on the p layer in the high-mesa waveguide to cause such concerns as generation of the incident light power dependence and the bias voltage dependence in modulation efficiency, lowering of the resisting pressure, and the like. Although various proposals with respect to these problems have been made (Patent Literatures 3 and 4), all of these proposals require complicated structures and the optimization of the material resistance, so that many problems as a practical device thus remain. As a result, in the current research and development, the most of research institutes employ the conventional pin structure from the viewpoint of the electrical stability (Non Patent Literature 1).

In addition, electroabsorption (EA) type modulators of a nip structure in which an upper layer clad is of n-type, a lower layer clad and a substrate are of p-type for reduction in contact resistance have been proposed (Patent Literature 5). However, the EA modulator generally has an electrode structure of a lumped constant type, and thus does not need to satisfy the characteristic impedance, the velocity matching between a light wave and microwave, and the like. Meanwhile, in the MZ modulator having an electrode length longer by approximately one order of magnitude than that of the EA modulator, it cannot be said that simply reversing the semiconductor layer structure is not sufficient for the improvement in the modulation bandwidth. This is apparent because only about 5 GHz of the bandwidth improvement is expected from the comparison between p-i-n and n-i-p in FIG. 2. Moreover, as in Patent Literature 4, using a conductive substrate (p-type substrate) results in a lager parasitic capacitance compared with that of a semi-insulating substrate, and therefore employing this technique without any change to an MZ modulator using the traveling-wave type electrode structure still has problems.

As an approach by the improvement in the semiconductor layer, a cross-sectional structure as illustrated in FIG. 3 has been proposed (for example, Non Patent Literature 1). A capacitance-loaded electrode structure is employed in FIG. 3, in which a coplanar-strip line including electrodes with large cross-sectional areas is used as a main line, and a lumped constant electrode (capacitance) which is separated in a length sufficiently shorter than the micro wave is added on an optical waveguide. A signal electrode 16 and a ground electrode 17 are provided on a p-type clad layer 19 via a p-type contact layer 20. This allows the high-speed operation thanks to the low loss of the main line to be expected, and also allows the characteristic impedance and the microwave velocity to be independently controlled, thus having extreme high design flexibility.

CITATION LIST

Patent Literature

PTL 1: Japanese Patent Laid-Open No. 2008-233710
PTL 2: Japanese Patent Laid-Open No. 2005-099387
PTL 3: Japanese Patent Laid-Open No. 2005-114868
PTL 4: Japanese Patent Laid-Open No. 2008-107468
PTL 5: Japanese Patent Laid-Open No. H8-122719

Non Patent Literature

NPL 1: R. Kaiser, et al. "High Performance Travelling Wave Mach-Zehnder Modulators for Emerging Generations of High Capacity Transmitter Components" International Conference on. Transparent Optical Networks ICTON 2013, We. D2.2

SUMMARY OF INVENTION

Technical Problem

However, the electrode structure illustrated in FIG. 3 is only applied to a semiconductor element having the pin structure from the top layer, but has not reached an ultimate high-speed modulation operation by optimizing both of the semiconductor layer and the electrode structure. Moreover, because in the pin structure, the waveguide is formed in the [0*1] plane direction, a dry etching process needs to be used for vertical etching processing of the clad layer in the upper portion as is in FIG. 3. Note that, in the present description, about the expression of the crystal plane, the number represented by an asterisk (*) means "1 with overbar". This is because a wet etching process results in a so-called forward mesa orientation, so that the processed waveguide shape is a trapezoid shape, which causes the degradation of electrical characteristics. Accordingly, the controllability of the etching depth cannot be assured, and there is a possibility that the interface damage during the processing may cause the optical characteristic degradation and the electrically unstable operation.

Accordingly, the problems of the electrical surge and the unstable operation remain in the high-mesa waveguide type optical modulation element of the npin layer structure, and the conventional capacitance-loaded type optical modulation element with the negative effect to the high-speed operation due to the upper p-type clad layer having the high contact resistance and material resistance is requested to have the high processing accuracy when the ridge waveguide is processed.

The present invention is made in view of the abovementioned conventional problems, and an object of the present invention is to provide a Mach-Zehnder (MZ) type semiconductor optical modulation element that can be used as a modulator that is ultrafast and excellent in electrical stability.

Solution to Problem

To solve the abovementioned problems, the invention described in one embodiment is a semiconductor optical modulation element of a Mach-Zehnder type that performs modulation of light using a refractive index modulation region where a refractive index of the light guided to an optical waveguide is modulated and an input and output region where multiplexing/demultiplexing of the light split in the refractive index modulation region is performed, characterized in that in the refractive index modulation region of the optical waveguide, on a substrate surface equivalent to a (100) plane of a sphalerite-type semi-insulating semiconductor crystal substrate, at least an n-type clad layer, an i core layer, and a p-type clad layer are stacked from a top layer toward the substrate surface, the n-type clad layer is formed in a ridge shape in an inverted mesa direction which is equivalent to a [011] plane direction , and a capacitance-loaded electrode is provided on the n-type clad layer.

DESCRIPTION OF EMBODIMENTS

Hereinafter, an embodiment of the present invention is described in details.

Figure 1:
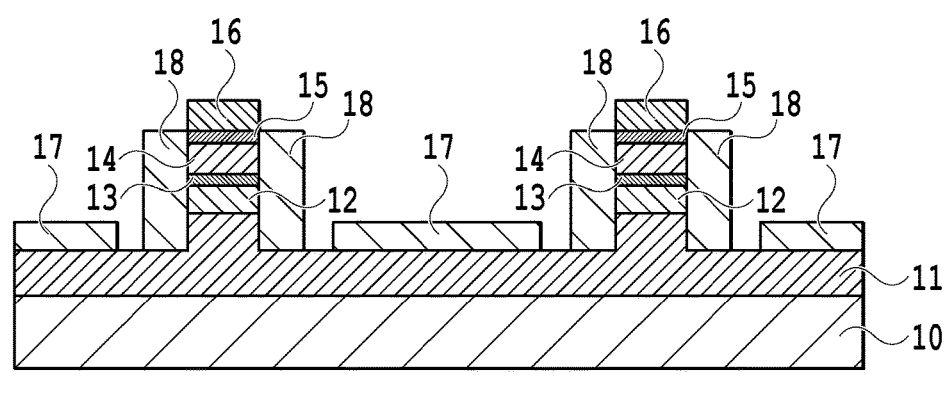
FIG. 1 is a view illustrating an example of a configuration of a conventional semiconductor optical modulation element.
Figure 1:
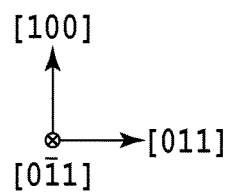
Figure 2:
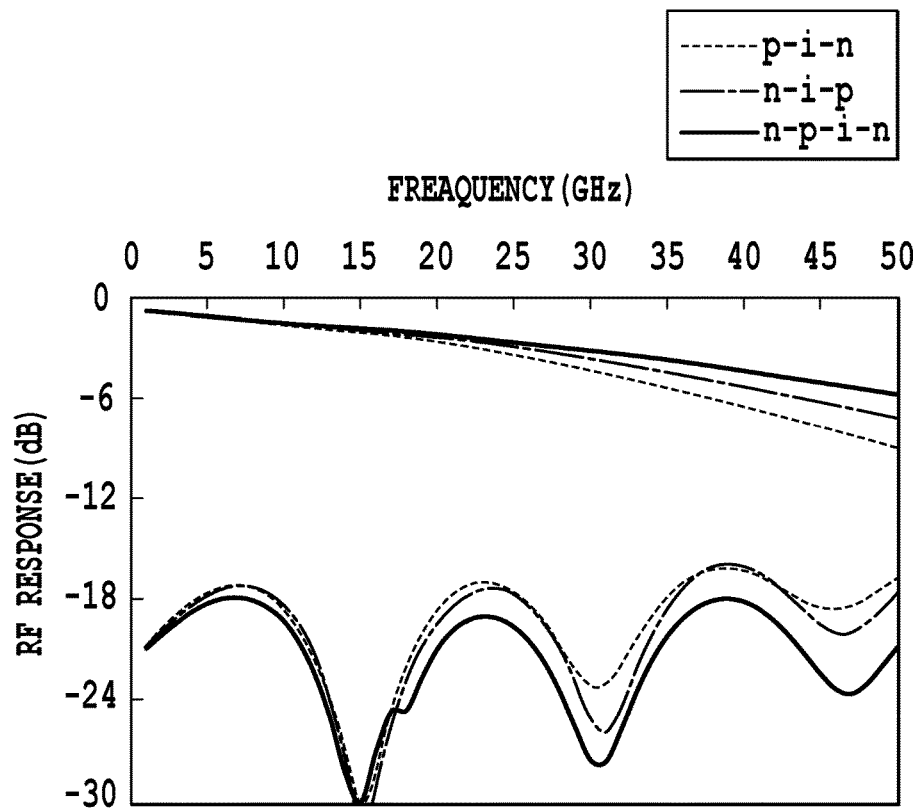
FIG. 2 is a view illustrating a layer structure dependence in the RF responses of an optical modulator having a coplanar electrode structure.
Figure 3:
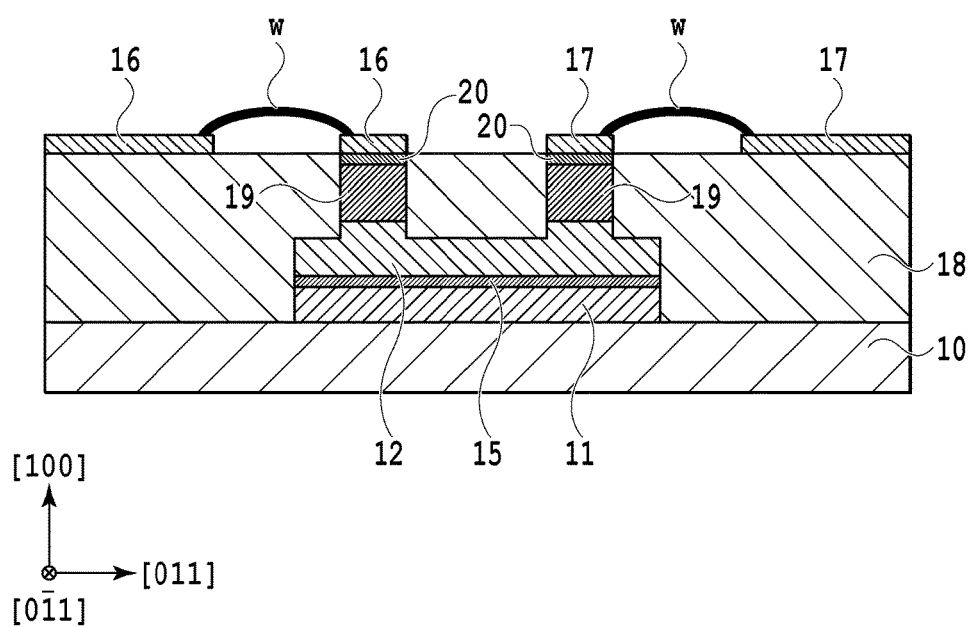
FIG. 3 is a view illustrating another example of the configuration of a conventional semiconductor optical modulation element.
Figure 4:
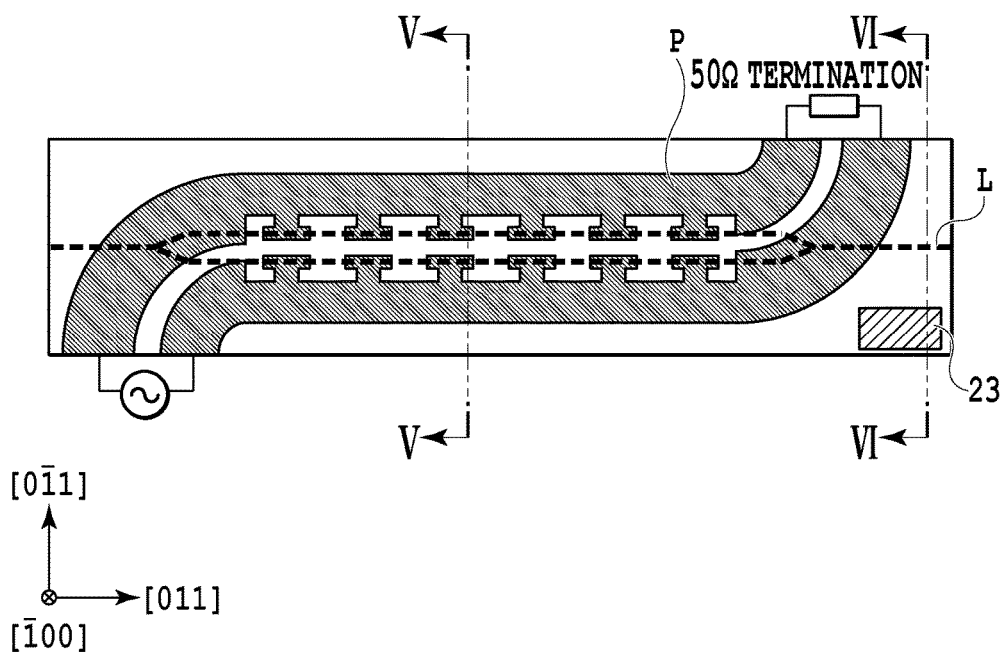
FIG. 4 is a plan view of a semiconductor optical modulation element according to the present invention.
Figure 5:
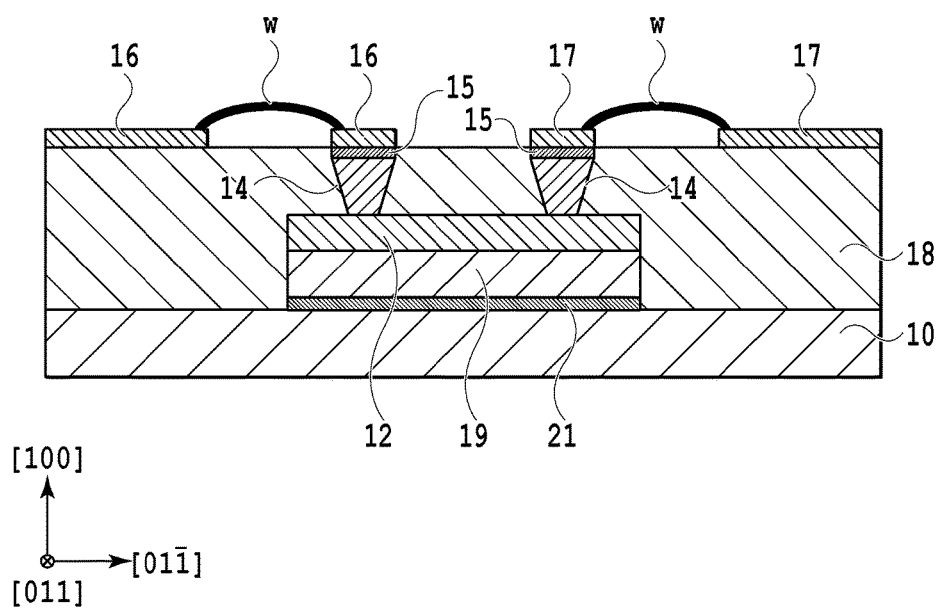
FIG. 5 is a view illustrating a cross section of a refractive index modulation region of the semiconductor optical modulation element.
Figure 6:
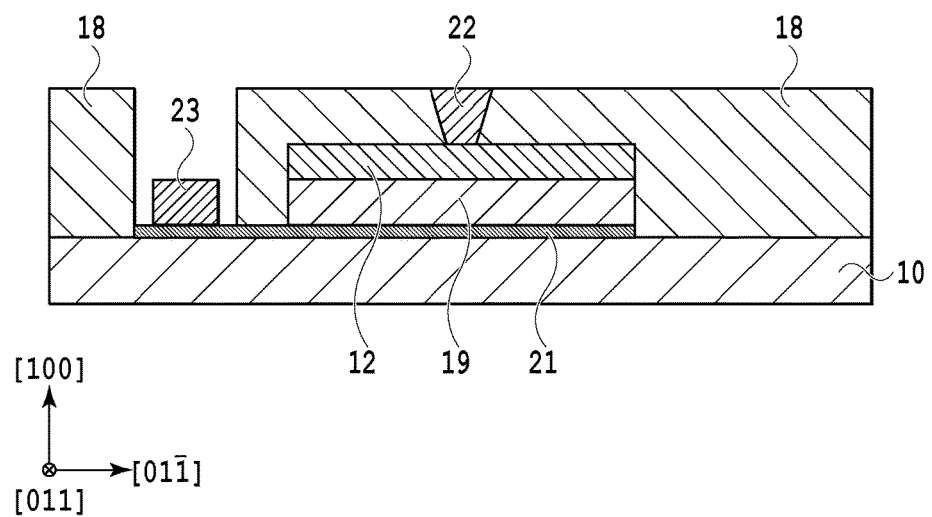
FIG. 6 is a view illustrating a cross section of an input and output region of the semiconductor optical modulation element.

FIG. 4 is a plan view of a semiconductor optical modulation element in the present invention, FIG. 5 is a cross-sectional view of a refractive index modulation region (V-V) of the semiconductor optical modulation element, and FIG. 6 is a cross-sectional view of an input and output region (VI-VI), where the refractive index of the light is not modulated, of the semiconductor optical modulation element. The refractive index modulation region indicates a region where applying electric signals to have a core layer causes a secondary optical effect therein, thereby modulating the refractive index in the core layer. The semiconductor optical modulation element of the present invention is configured as a Mach-Zehnder type optical waveguide L in which a capacitance-loaded type traveling-wave electrode pattern P is formed on an upper surface thereof, as illustrated in FIG. 4.

The optical waveguide is, as illustrated in FIG. 4, a semiconductor optical modulation element of a Mach-Zehnder type that performs modulation of light using a refractive index modulation region where the refractive index of the light guided to an optical waveguide is modulated and an input and output region where multiplexing/demultiplexing of the light split in the refractive index modulation region is performed, and the optical waveguide is provided with a configuration in which, in the refractive index modulation region thereof, on a substrate surface equivalent to a (100) plane of a sphalerite-type semi-insulating semiconductor crystal substrate 10, an n-type clad layer 14, an i core layer 12, and a p-type clad layer 19 are stacked in the order from the top layer, the n-type clad layer 14 is formed in a ridge shape in an inverted mesa direction, and a capacitance-loaded electrode is provided on the n-type clad layer 14. Preferably as illustrated in FIG. 6, in a portion of the optical waveguide where the refractive index of the light is not modulated, a semi-insulating InP clad layer 22, the i core layer 12, and the p-type clad layer 19 are stacked in the order from the top layer on the substrate surface equivalent to the (100) plane of the sphalerite-type semi-insulating semiconductor crystal substrate 10. As for the sphalerite-type semi-insulating semiconductor crystal substrate 10, for example, an InP substrate can be used.

For example, on the substrate surface equivalent to the (100) plane of the sphalerite-type semi-insulating semiconductor crystal substrate 10, the n-type clad layer 14, the i core layer 12, and the p-type clad layer (p-type carrier stop layer) 19 are successively stacked in the order from the top layer, the n-type clad layer 14 in a portion where the refractive index of the light is not modulated is removed and the removed part is backfilled with the semi-insulating InP clad layer 22, and thereafter the clad layer is subjected to etching of a Mach-Zehnder waveguide shape in a direction equivalent to a [011] plane direction, thereby the clad layer of the optical modulation waveguide can be formed in a ridge shape in the inverted mesa direction. In the refractive index modulation region, a capacitance-loaded type electrode structure can be formed on an upper surface of the n-type clad layer 14.

The clad layers 14, 22 are subjected to etching of a Mach-Zehnder waveguide shape in the direction equivalent to the [011] plane direction, so that the clads 14, 22 of the optical modulation waveguide are formed in a ridge shape in the inverted mesa direction.

The capacitance-loaded type electrode structure is provided in such a manner that a signal electrode 16 and a ground electrode 17 are formed on the upper surface of the n-type clad layer 14 via the n-type contact layer 15, and the signal electrode 16 or the ground electrode 17 is electrically connected to a signal electrode 16 or a ground electrode 17 provided on the insulating layer at both sides of the waveguide via bonding wires w. The capacitance-loaded electrode can be connected to a differential signal source via a differential line wiring board.

Moreover, as illustrated in FIG. 6, the p-type clad layer 19 is brought into contact with an electrode 23 that is connected to a power source, via a p-type contact layer 21.

The semiconductor optical modulation element illustrated in FIGS. 4, 5, and 6 generates a secondary electric optical effect in the i core layer 12, thereby modulating the refractive index, and modulating light guided to the Mach-Zehnder type optical waveguide.

In the semiconductor optical element having the above-mentioned configuration, firstly, in order to achieve the reduction in the contact resistance, which has been the problem in the conventional capacitance-loaded type electrode modulator, the waveguide mesa upper portion (upper layer of the core) with a small contact area with the electrode is formed not a p-type but n-type clad. This reduces the contact resistance by approximately one order of magnitude from the conventional one.

Secondly, in order to make ridge waveguide processing easy, the waveguide stripe direction (waveguide longitudinal direction) is made to be equivalent to the [011] plane direction, and the insulating layer is etched in the inverted mesa direction.

Thirdly, the p-type clad layer thickness having a bulk material resistance larger than that of the n-type is thin-filmed, and the core layer and the thin-film p layer are vertically sandwiched between the n-type clad layers, thereby ultimately reducing the semiconductor resistance and providing the high-speed modulator.

Fourthly, in order to electrically further stabilize the modulator, the electrode is brought into contact with the p-type semiconductor on which hole carriers are accumulated, and the accumulated carrier are extracted. With these configurations, the high-speed modulator can be achieved.

The present invention can form a semiconductor optical element that is used as a high-speed modulator having the electrical surge resistance by employing the ridge structure waveguide in the modulation region while assuring the high-speed operation due to the contact resistance reduction and the thinned p-type clad layer (low resistant). Moreover, holes accumulated on the p-type layer are diffused to a slab waveguide side, which is outside of a light propagation region, in the ridge structure, thereby making it possible to lower the hole concentration per unit volume compared with that of the high-mesa waveguide structure. Moreover, further lowering of the hole concentration can be expected by making these p-type layers conduct to the electrode connected to the power source. As a result, the unstable modulation operation is suppressed.

In addition, the p-type layer is deposited to the lower layer of the non-doped layer (nip and nipn structures), these devices are subjected to etching in a direction equivalent to the [011] plane direction and the n-type clad layer is backfilled to form the clad of the optical modulation waveguide so as to be a ridge shape in the inverted mesa direction, thereby easily forming the ridge waveguide by wet etching, which results in the improvement in the controllability of the ridge shape processing and the electrical stability of the waveguide surface, compared with a case of only dry etching processing.

EXAMPLE 1

In an example 1, an optical semiconductor element having cross sections illustrated in FIGS. 5 and 6 was prepared. A semiconductor optical modulation element in the present example has a nip-type configuration. As a semiconductor layer, the n-type contact layer 15, the n-type clad layer 14, the non-doped clad core layer 12, the p-type clad 19, and the p-type contact layer 21 are successively stacked in this order from the top layer on the substrate 10.

For example, the upper layer n-type contact layer 15 includes InGaAs having a carrier concentration of $5E+18$ $cm^{-3}$, and the n-type clad layer 14 includes InP having a carrier concentration of $1E+18$ $cm^{-3}$. Moreover, the carrier concentration of the p-type InP clad layer 19 is set to $5E+17$ to $1E+18$ $cm^{-3}$ in view of the light absorption coefficient and the electrical resistivity. For the p-type contact layer 21, in order to reduce the contact resistance, InGaAs in which hole carriers were doped $5E+18$ $cm^{-3}$ or more was used. Note that, the InGaAsP layer 15 was inserted as the topmost layer of the non-doped layer 12 for utilizing the selectivity with the InP n-type clad layer 14 in the wet etching.

The crystal growth was deposited on the semi-insulating InP (100) substrate 10 by the Metal Organic Vapor Phase Epitaxy (MOVPE). The band gap wavelength of the core layer 12, which is the operation light wavelength, is determined within a range in which an electric optical effect is caused to effectively act with high efficiency and the light absorption causes no problem. For example, in a case of 1.55 micron band, the light-emitting wave length of the core layer 12 is set to about 1.4 micron meters. The core layer 12 is preferably caused to form in the multiple quantum well structure of InGaAlAs/InAlAs in the viewpoint of the high efficiency modulation, and it is apparent that the advantage by the present invention be not lost with the multiple structure of InGaAsP/InP or InGaAsP/InGaAsP, for example. Moreover, the compositions of the contact layers 15, 21 and the clad layers 14, 19 are not limited to the above described, and using the InGaAsP composition, for example, causes no problem.

After the nip semiconductor layer is formed, the upper n-type clad layer 14 in a region where the refractive index of the light is not modulated is removed by dry etching and wet etching, for the purpose of electric isolation between the elements. Moreover, from the viewpoint of the optical loss reduction, the removed part is backfilled with the semi-insulating InP 22.

Thereafter, an MZ interferometer waveguide pattern including $SiO_2$ formed in a direction equivalent to the [011] plane direction is formed, and an optical waveguide of a ridge shape is formed in the inverted mesa direction by dry etching and wet etching processing. Specifically, after the n-type contact layer 15 and a part of the n-type clad layer 14 are subjected to dry etching, the n-type clad layer 14 is subjected to wet etching, thereby forming the optical waveguide of a ridge shape in the inverted mesa direction. Subsequently, in order to cause the bias voltage to be applied to the lower p-type clad layer 19, dry etching and wet etching are further conducted to cause a part of the p-type contact layer 21 to be exposed as illustrated in FIG. 6, and to be brought into contact with the electrode 23.

Benzocyclobutene (BCB) as an insulating layer 18 is applied to the exposed part of the p-type contact layer 21 to planarize recesses and projections of the waveguide. Thereafter, a capacitance-loaded type traveling-wave electrode pattern P as illustrated in FIG. 4 is formed by a gold plating method. Note that, using a polyimide or the like, that is the insulating low refractive index material, other than BCB, causes no problem.

For driving the created semiconductor optical element as a modulator, after a predetermined bias is caused to apply to the DC bias electrode 23 such that the reverse direction electric field is applied to a pn junction, a high frequency signal is fed to a signal electrode (coplanar strip line). As a result, although the modulator can be driven by causing a single-phase signal to fed, form the viewpoint of the low electric-power consumption, it was understood that the modulator can be driven by causing a differential signal to be fed, which causes no problem.

EXAMPLE 2

Figure 7:
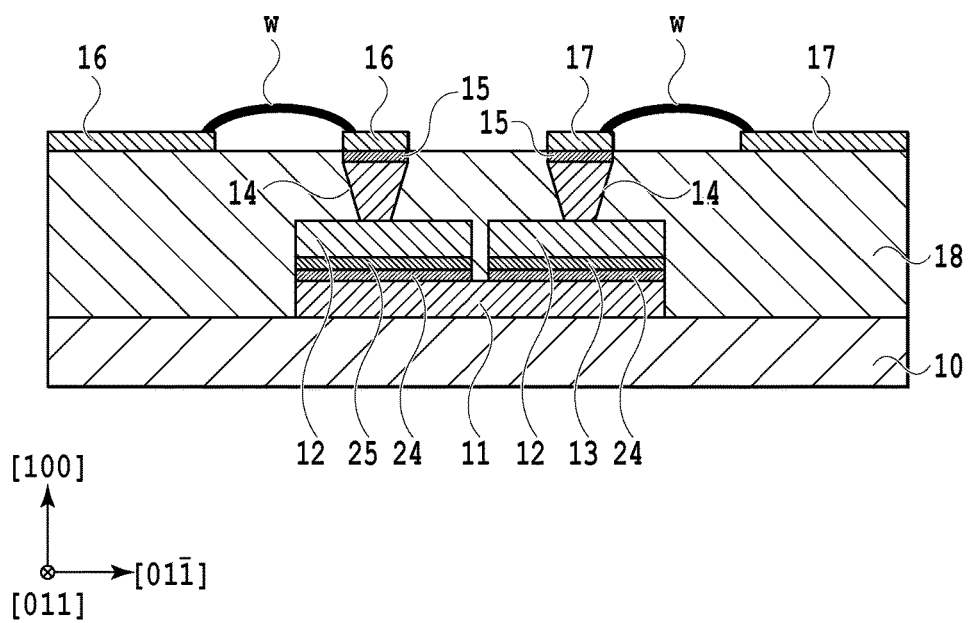
FIG. 7 is a view illustrating a cross section of a refractive index modulation region of a semiconductor optical modulation element in an example 2.
Figure 8:
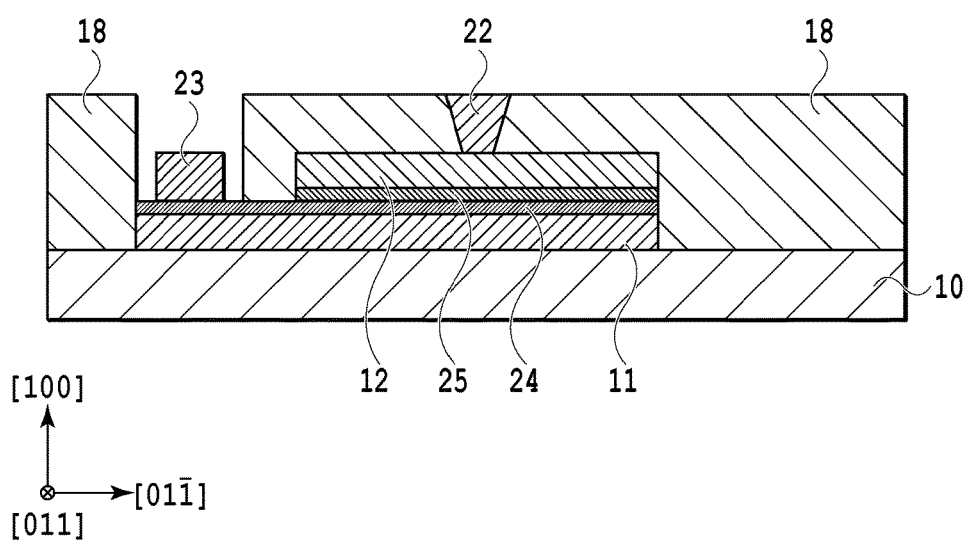
FIG. 8 is a view illustrating a cross section of an input and output region of the semiconductor optical modulation element in the example 2.

FIGS. 7 and 8 are views illustrating cross sections of a semiconductor optical modulation element according to an example 2 of the present invention. FIG. 7 is a cross-sectional view of V-V in FIG. 4, and Fig. 8 is a cross-sectional view of VI-VI in FIG. 4. The semiconductor optical modulation element in the present example has a nipn-type configuration. In the same drawings, in the semiconductor optical modulation element, the n-type contact layer 15, the n-type clad layer 14, the non-doped clad core layer 12, a p-type carrier block layer 25, the n-type contact 24, and the n-type clad layer 11 are stacked in this order on the substrate 10.

For example, the upper layer n-type contact layer 15 includes InGaAs having a carrier concentration of $5E+18$ $cm^{-3}$, and the n-type clad layer 14 includes InP having a carrier concentration of $1E+18$ $cm^{-3}$. Moreover, hole carriers of $1E+18$ $cm^{-3}$ are doped to InAlAs having a large band gap such that the p-type carrier block layer 25 becomes a sufficient barrier with respect to electrons. Note that, the InGaAsP layer 15 was inserted as the topmost layer of the non-doped layer for utilizing the selectivity with the InP n-type clad layer 14 in the wet etching.

The crystal growth was deposited on the semi-insulating InP (100) substrate 10 by the Metal Organic Vapor Phase Epitaxy (MOVPE). The band gap wavelength of the core layer 12, which is the operation light wavelength, is determined within a range in which an electric optical effect is caused to effectively act with high efficiency and the light absorption causes no problem. For example, in a case of 1.55 micron band, the light-emitting wave length of the core layer 12 is set to about 1.4 micron meters. The core layer 12 is preferably caused to form in the multiple quantum well structure of InGaAlAs/InAlAs in the viewpoint of the high efficiency modulation, and it is apparent that the advantage by the present invention be not lost with the multiple structure of InGaAsP/InP or InGaAsP/InGaAsP, for example. Moreover, the composition of the contact clad carrier block layer 13 is not limited to the abovementioned, but the InGaAsP composition, for example, may be used.

After the nipn semiconductor layer is formed, the upper n-type clad layer 14 in a region where the refractive index of the light is not modulated is removed by dry etching and wet etching, for the purpose of electric isolation between the elements. Moreover, from the viewpoint of the optical loss reduction, the removed part is backfilled with the semi-insulating InP 22.

Thereafter, an MZ interferometer waveguide pattern including $SiO_2$ formed in a direction equivalent to the [011] plane direction is formed, and an optical waveguide of a ridge shape is formed by dry etching and wet etching processing.

Figure 9:
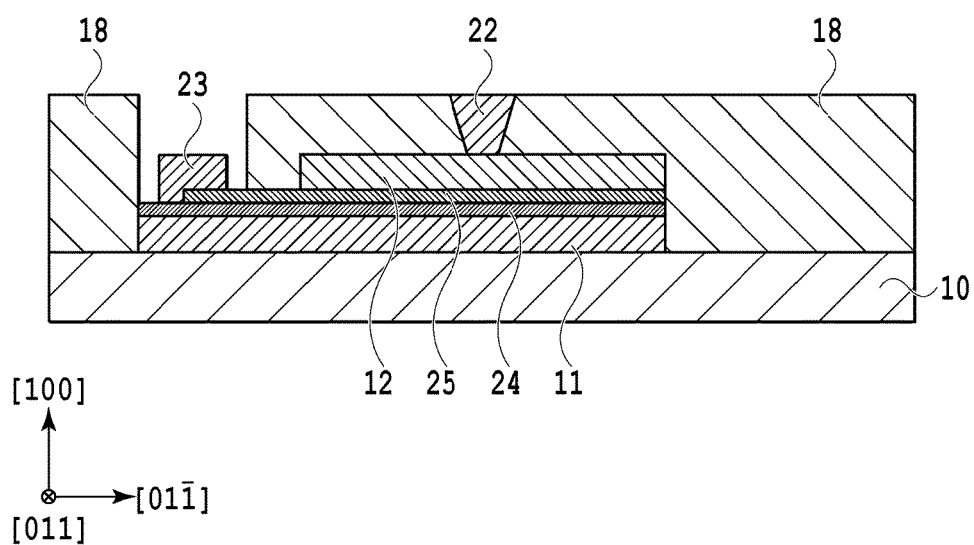
FIG. 9 is a view illustrating a cross section of the input and output region of the semiconductor optical modulation element in the example 2.

Subsequently, in the input and output region, in order to cause the bias voltage to be applied to the lower n-type clad 11, dry etching and wet etching are further conducted to cause a part of the p-type contact layer 24 to be exposed as illustrated in FIG. 8, and to be brought into contact with the electrode 23. Note that, in order to further stabilize the modulation operation (prevention of hole carrier accumulation in the p layer), instead of the configuration illustrated in FIG. 8, as illustrated in FIG. 9, in addition to the n-type contact layer 24, apart of the p-type carrier block layer 25 may be also exposed and brought into contact with the electrode 23.

Benzocyclobutene (BCB) as an insulating layer 18 is applied to the exposed part of the p-type carrier block layer 25 to planarize recesses and projections of the waveguide. Thereafter, a capacitance-loaded type traveling-wave electrode pattern P as illustrated in FIG. 4 is formed by a gold plating method. Note that, using a polyimide or the like, that is the insulating low refractive index material, other than BCB, causes no problem.

For driving the created semiconductor optical element as a modulator, after a predetermined bias is caused to apply to the DC bias electrode 23 such that the reverse direction electric field is applied to a pn junction, a high frequency signal is fed to a signal electrode (coplanar strip line). As a result, although the modulator can be driven by causing a single-phase signal to fed, from the viewpoint of the low electric-power consumption, it was understood that the modulator can be driven by causing a differential signal to be fed, which causes no problem.

REFERENCE SIGNS LIST 10 semiconductor crystal substrate
11 n-type clad layer
12 i core layer
13 p-type carrier block layer
14 n-type clad layer
15 n-type contact layer
16 signal electrode
17 ground electrode
18 insulating film
19 p-type clad layer
20 p-type contact layer
21 p-type contact layer
22 SI type clad layer
23 DC bias electrode
24 n-type contact layer
25 p-type carrier block layer
L optical waveguide
P traveling-wave electrode pattern
w bonding wire

The invention claimed is:

1. A semiconductor optical modulation element of a Mach-Zehnder type comprising:
an optical waveguide that includes a refractive index modulation region that performs modulation of light such that a refractive index of the light guided to the optical waveguide is modulated; and
an input and output region where multiplexing/demultiplexing of the light split in the refractive index modulation region is performed, wherein
in the refractive index modulation region of the optical waveguide, on a substrate surface equivalent to a (100) plane of a sphalerite-type semi-insulating semiconductor crystal substrate, at least an n-type clad layer, an i core layer, and a p-type clad layer are stacked from a top layer toward the substrate surface, the n-type clad layer is formed in a ridge shape in an inverted mesa direction, said p-type clad layer is in a slab shape which is wider than the ridge shape, and a capacitance loaded electrode is provided on the n-type clad layer.

2. The semiconductor optical modulation element according to claim 1, wherein in a portion of the optical waveguide where the refractive index of the light is not modulated, at least a semi-insulating InP clad layer, the i core layer, and the p-type clad layer are stacked from the top layer toward the substrate surface on the substrate surface equivalent to the (100) plane of the sphalerite-type semi-insulating semiconductor crystal substrate.

3. The semiconductor optical modulation element according to claim 1, wherein the n-type clad layer is subjected to etching in a direction equivalent to a [011] plane direction in a Mach-Zehnder waveguide shape, and thus is formed so as to have a ridge shape in the inverted mesa direction.

4. The semiconductor optical modulation element according to claim 1, wherein the optical waveguide is formed of a semiconductor multilayer structure including at least the n-type clad layer, the i core layer, the p-type clad layer, and the n-type clad layer successively from the top layer toward the substrate surface.

5. The semiconductor optical modulation element according to claim 4, wherein the p-type clad layer is electrically brought into contact with an electrode connected to a power source.

6. The semiconductor optical modulation element according to claim 1, wherein the capacitance loaded electrode is connected to a differential signal source via a differential line wiring board.

* * * * *